June 22, 1965  E. R. ARIESSOHN ETAL  3,190,950
PICTORIAL POSITION DISPLAY
Filed March 13, 1961  4 Sheets-Sheet 1

INVENTORS
EDMOND R. ARIESSOHN
HENRY A. HAMMERSTEIN
GEORGE W. SHEPHERD Jr.
BY Samuel J Snyder EDMOND R. ARIESSOHN
HENRY A. HAMMERSTEIN
GEORGE W. SHEPHERD Jr.
*INVENTORS*

EDMOND R. ARIESSOHN
HENRY A. HAMMERSTEIN
GEORGE W. SHEPHERD Jr.
*INVENTOR.*

BY SAMUEL J. SNYDER

June 22, 1965

E. R. ARIESSOHN ETAL 3,190,950

PICTORIAL POSITION DISPLAY

Filed March 13, 1961

EDMOND R. ARIESSOHN
HENRY A. HAMMERSTEIN
GEORGE W. SHEPHERD Jr.
INVENTORS

BY *Samuel J Snyder*
ATTORNEY

United States Patent Office 3,190,950
Patented June 22, 1965

3,190,950
PICTORIAL POSITION DISPLAY
Edmond R. Ariessohn, Northvale, Henry A. Hammerstein, Dumont, and George W. Shepherd, Jr., Fairlawn, N.J., assignors to ACF Industries, Incorporated, New York, N.Y., a corporation of New Jersey
Filed Mar. 13, 1961, Ser. No. 95,139
13 Claims. (Cl. 35—10.2)

This invention relates to pictorial position displays and more particularly to the type carried in an aircraft as a navigational aid to indicate to the pilot the position of the aircraft by means of a reticle moving relative to a map of the territory over which the aircraft is flying.

The present invention is an improvement of the pictorial positional display navigational system disclosed in pending application Serial No. 57,536 of George W. Shepherd, Jr., and Henry A. Hammerstein, filed September 21, 1960, and assigned to the same assignee as is this application. The invention provides, particularly, improved and less expensive means for moving and displaying the aircraft symbol or indicator, and presents the true ground range of the aircraft relative to a reference or destination point, instead of the slant range.

The invention is designed to be employed with an aircraft's existing cockpit instrumentation of the type that gives range and bearing information from a fixed ground radio station such as a facility of either the military TACAN (Tactical Air Navigation) System or of what is the primary commercial air navigation system of the United States popularly known as VORTAC from the fact that it transmits VOR (VHF Omni-directional Range) bearing signals and uses the distance measuring equipment of the TACAN System for range signals. It is designed to be used as both a pilot's navigational aid and a means of developing a more effective system of air traffic control.

With existing instrumentation the pilot or navigator must spread out a map of FAA (Federal Aviation Agency) airways if flying en route, or of FAA approaches if coming into a terminal area, take the bearing and range data in the form in which it is presented as an instrument reading, convert it to map scale and plot it on the map before he can orient his position. For routine position checks during a flight he must plot a great number of points along the way. This is a tedious and time consuming operation and when the speeds of today's and tomorrow's aircraft are contrasted with the relatively small areas involved and the accuracies demanded by the approach procedures, it imposes an undue hardship on the pilot or navigator, for just at the time when he must concentrate most seriously on all the details of making an approach, he must also check most carefully on his map plotting. The pictorial position display does the map plotting automatically and he may determine his position at a glance.

As an aid to a system of air traffic control the present invention presents a method of increasing system capacity. Although conventional aircraft employ numerous types of instrumentation, the great majority generally permit the pilot to receive precise navigational guidance only when proceeding along selected radials from ground stations. Inasmuch as increasing air traffic will require additional flight paths, if existing instrumentation is to be continued, either the new paths must converge over existing ground stations or a new series of ground stations must be installed to provide guidance along the new paths. Since the installation of additional ground stations provides technical and economic problems of considerable magnitude, it is desirable to make better use of the existing ground stations.

Prior pictorial position displays using a reticle moving in bearing and range with respect to a fixed map or chart are handicapped by the fact that they are rather expensive in themselves, or that they are associated with the complete navigational electronic equipment and the overall expense is prohibitive for general use. In addition, the older pictorial position displays did not furnish a guide to a pilot for flying a course not marked on his chart.

The maps to be used with the pictorial position display can be imprinted with flight paths of any maneuverable design and since a pilot can quickly determine what flight maneuver will correspond to a desired map direction, he can easily maneuver the aircraft, so that the map reticle follows the map paths. With the use of the invention, pilots can fly off course, circular routes and holding patterns over any point, the flying of straight VOR radials can be eliminated and system designers can develop routes which incorporate parallel and off-set courses in terminal and en route areas and planes can be cleared in and out of airports faster, without costly stacking and holding delays.

It is accordingly an object of this invention to provide an improved pictorial position display.

It is another object of this invention to provide an inexpensive and compact pictorial position display.

It is an additional object to provide a pictorial position display with automatic range scale switching.

It is a still additional object to provide a pictorial position display which indicates ground range relative to a reference station.

It is a further object to provide a pictorial position display that can be used with existing cockpit instrumentation by suitable connections.

It is a still further object to provide an improved pictorial position display that will enable a pilot to fly any course whether or not marked by a flight path displayed on a map.

It is still another object to provide a pictorial position display which permits the use of conventional opaque charts which are commercially on the market.

These objects are accomplished in the present invention by a compactly packaged rho-theta type indicator which positions a reticle relative to a scaled map of the territory over which the aircraft is flying. The indicator is adapted to be connected into an aircraft's bearing and range receivers which are tuned to a ground station transmitting bearing and range signals and to modify the receiver voltages to be compatible with the required display inputs. The bearing signals drive the reticle through a servo system about a central reference axis perpendicular to the display to assume an angular position relative to a magnetic north reference line. This angular position corresponds to the bearing of the aircraft from the ground transmitter. The range signals drive the reticle through another servo system at a distance from the reference axis proportional to the range of the aircraft from the ground transmitter.

Each map depicts one key ground station and adjacent territory with all pertinent aircraft navigation information for that territory and is one of a series making up an entire area. When the maps are inserted they are indexed with Magnetic North up and with the key station aligned with the reference axis. The position of the reticle relative to the scaled map indicates to the pilot the actual position of the aircraft. When the reticle comes to the edge of one map indicating that the aircraft is leaving the territory represented by that map, the pilot substitutes either another map of the adjacent territory and tunes his receivers to the ground transmitting station corresponding to the key station on the substituted map, or substitutes a larger scale map keyed to the same reference station. The servo systems then position the reticle to its scaled position on the new map with respect to the second key station or the same key station at the new scale.

Rotationally mounted to the Display above the map is a circular transparent course selector disc marked with a series of parallel lines which can be rotated to extend the lines across the map in the direction of any desired course, so that if the pilot flies his aircraft to guide the reticle travel parallel to the course lines he is assured of being on course.

Figure 1:
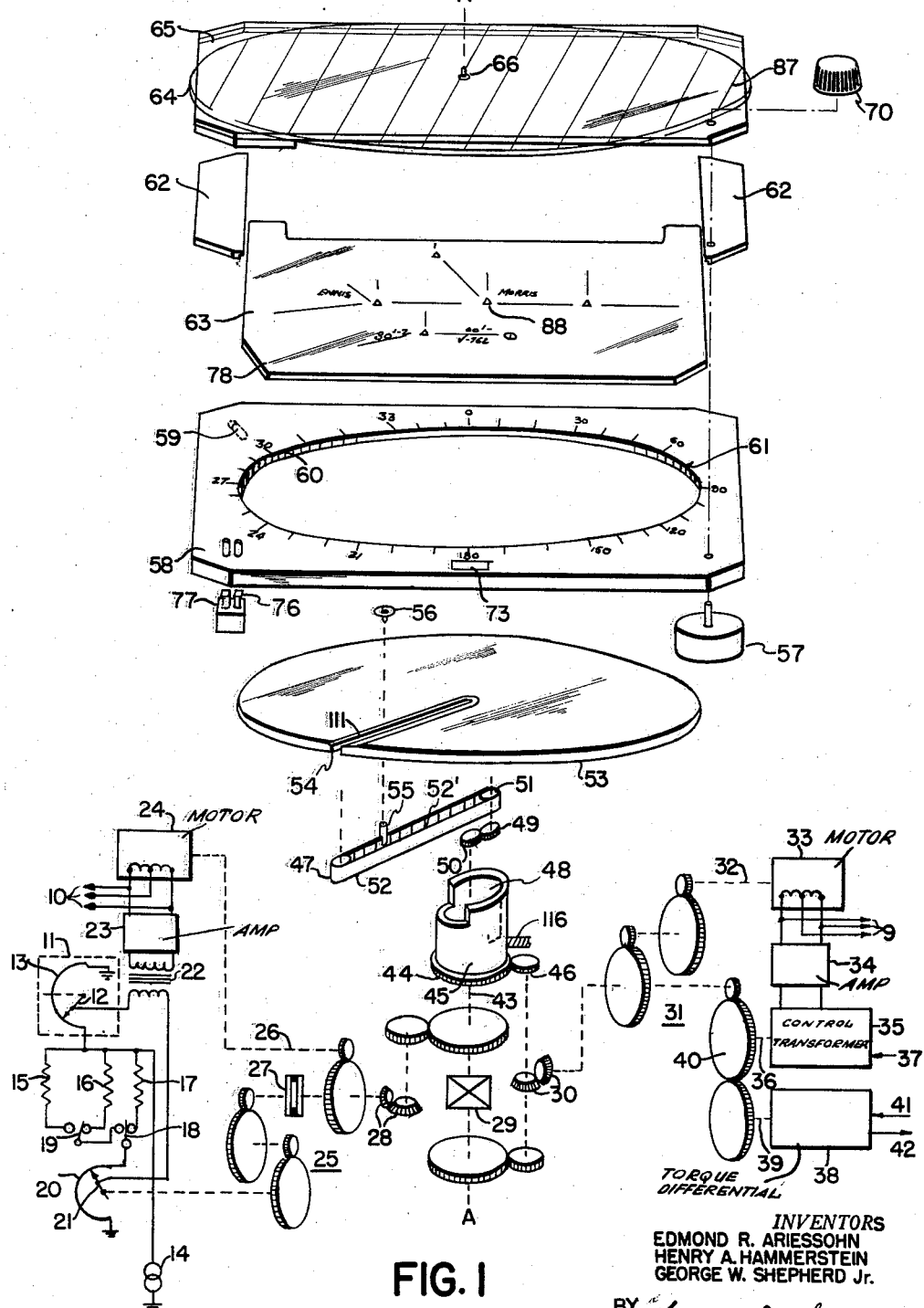
FIG. 1 is a perspective assembly drawing partially exploded of the Pictorial Position Display.

Referring now to FIG. 1 which is an exploded drawing illustrating the principle of operation of the Pictorial Position Display, the range signal input is obtained from the output of the applicable navigational instrument in the aircraft which in FIG. 1 is shown as a Tacan type DMET 11 (Distance Measuring Equipment Tacan) such as is manufactured by the Federal Division of International Telephone and Telegraph Company of Clifton, New Jersey.

The range signal is in the form of angular position of arm 12 on grounded potentiometer 13 which is in the DMET 11. The position of arm 12 is converted to voltage in potentiometer 13 and an electrical connection from arm 12 is then made to a conventional servo amplifier system which drives the remote shaft 26, gears 28, one input gear of mechanical differential 29 and through shaft 43 extending through hollow gear 44 to pinion 50 which drives belt 52 through gear 49 and pulley 51. Arm 21 of follow-up potentiometer 20 is mechanically coupled through a suitable gear reduction 25 to remote shaft 26. A clutch 27 is provided between the range servo motor 24 and the gear train 25 to allow the motor to continue turning after the arm on follow-up potentiometer 20 contacts the overtravel stop, not shown, thus protecting the gear train.

The ungrounded side of potentiometer 13 is connected to an alternating reference voltage 14, preferably 26 volts 400 cycle A.C., as are also the three range resistors 15, 16 and 17. The other side of resistors 15 and 16 is connected to the normally open and normally closed contacts of microswitch 19, respectively. The other side of resistor 17 is connected to the normally closed contact of microswitch 18. The pole of microswitch 19 is connected to the normally open contact of microswitch 18. The pole of microswitch 18 is connected to one side of follow-up potentiometer 20, the other side of potentiometer 20 being grounded. Movable arm 12 of potentiometer 13 is connected in series with the primary winding of isolation transformer 22 and to movable arm 21 of potentiometer 20.

Figure 4:
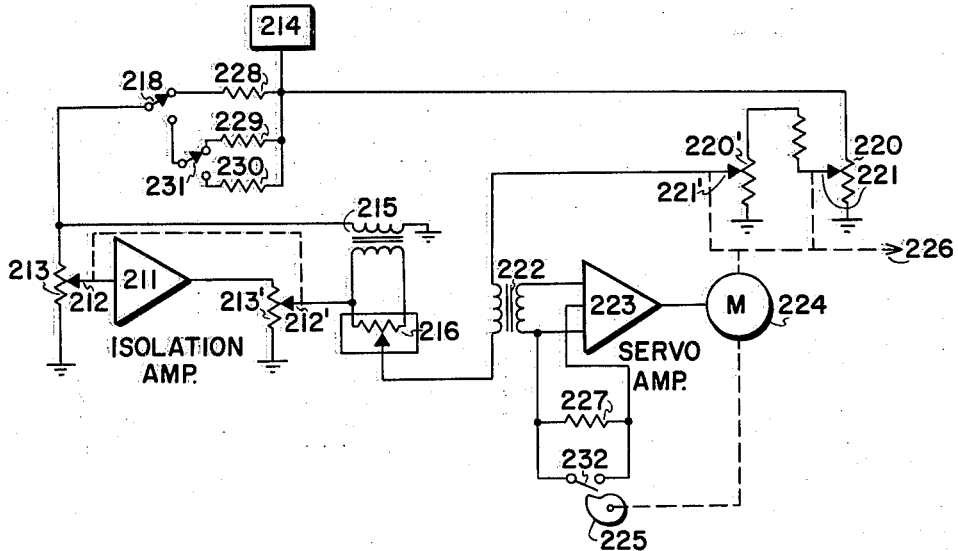
FIG. 4 is an electrical schematic diagram of a modification of the circuit of FIG. 1 for converting slant range to ground range.

The voltage difference between potentiometer arms 12 and 21 transformed through isolation transformer 22 constitutes the error voltage to the amplifier 23 and is of such character as to drive the range servo motor 24 and thereby arm 21 in a direction to reduce the error voltage to zero. Leads 10 are connected on one end to both sides and the center tap of the control winding of range servo motor 24 and are adapted to be connected at the other end to a fail-safe circuit as shown in FIG. 4 of copending application Serial No. 57,536.

The angular position of potentiometer arm 21 and hence the amount of rotation of gear train 25, depends not only upon the position of potentiometer arm 12 but also upon the amount of voltage applied to potentiometer 20. The position of microswitch arms 18 and 19 determines which of resistors 15, 16 and 17 is in series with potentiometer 20 and voltage source 14. Each of resistors 15, 16 and 17 establishes a different voltage across potentiometer 20 by well known voltage divider action. Thus for a different position of arm 12, the servo motor 24 will rotate arm 21 and hence the reticle drive belt 52 to different positions depending upon selection of the proper scale resistor 15, 16 or 17 by microswitch arms 18 and 19.

The invention illustrated in FIG. 1 is adapted for use with an Omni-Bearing Indicator (OBI), not shown, such as the type 337A-2 manufactured by Collins Radio Company of Cedar Rapids, Iowa. Of course, it should be understood that the equipment may be adapted to be used with any device other than an OBI which supplies Bearing information from the aircraft's VOR receiver.

An OBI gives a Magnetic Bearing reading from the aircraft to the VOR station. It contains a differential generator, not shown, the shaft of which is keyed to the OBI dial and is rotated in Bearing by the computer output ahead of it. Normally the input to the stator leads of the differential generator comes from the aircraft's magnetic compass, also not shown, and the rotor output leads reading Bearing-Heading are connected to the Double Barred Pointer Synchro of a Radio Magnetic Indicator (RMI) if one is used, also not shown, such as the type 332C-1 manufactured by the Kearfott Company, Inc., of Little Falls, New Jersey. To operate the Display, the OBI differential generator stator leads are disconnected from the compass and a voltage representing zero Heading is fed to the stator leads. The output of the OBI differential generator rotor is then in the form of a voltage representing Magnetic Bearing to the VOR station, and is connected into the apparatus shown in FIG. 1 by leads 37 to another conventional servo system 33-35 which drives the remote shaft 32, bevel gears 30, the other input gear of mechanical differential 29, pinion 46 and hollow gear 44. Hub 45 mounted in ball bearings 116 is fastened to gear 44 and rotates disc 53 about reference axis A—A through an angle corresponding to the Bearing input on leads 37 from the OBI. The input to differential 29 is to compensate for the translation of reticle 56 with rotation of bearing plate 53 which would otherwise introduce a range error into the displayed position. Reticle 56 therefore remains in the same position with respect to axis A—A as before rotation. In this bearing servo system, the synchro stator voltage on leads 37 is connected to the stator windings of control transformer 35. The rotor shaft of control transformer 35 is mechanically coupled to shaft 36 and by suitable gearing 31 to the bearing drive 32. The error voltage across the rotor leads of control transformer 35 is determined by the relative angular displacement between the position of shaft 36 and the shaft position in the OBI. The error voltage is amplified in amplifier 34 and fed to servo motor 33 which rotates shaft 36 through the reduction gearing 31 to reduce the error voltage to zero. Leads 9 are connected at one end to both sides and the center tap of the control winding of range servo motor 33 and are adapted to be connected to the Fail-Safe circuit of FIG. 4 of application Serial No. 57,536. When the cockpit instrumentation does not use a Radio Magnetic Indicator (RMI), torque differential 38 is not energized.

If an RMI is employed in the aircraft, the Bearing-Heading information previously supplied from the OBI must be restored to the Double Barred Pointer Synchro to make the RMI operative. For this purpose, torque differential 38 is employed. The magnetic compass output leads previously disconnected from the OBI as described heretofore are connected through leads 41 to the stator windings of torque differential 38 whose shaft is mechanically coupled to shaft 39 which, being geared to the bearing drive 32 of the Pictorial Position Display through gearing 31, corresponds to the OBI input bearing shaft, and the rotor windings output of torque differential 38 which is now Bearing-Heading is connected through leads 42 back to the RMI Double Barred Pointer Synchro, so that the instrumentation will operate as before.

The foregoing connections to conventional bearing indicating equipment are described merely as examples and not to limit the application of the invention to particular indicators or instrumentation. Any navigational computer supplying bearing information from a reference station may be employed by making suitable connections in a similar manner.

Figure 2:
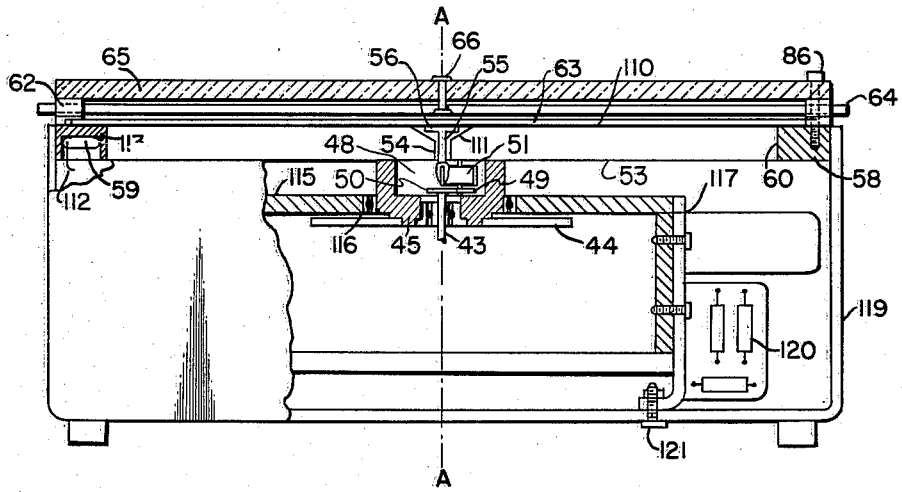
FIG. 2 is an elevation view partially in section taken along the line 2—2 of FIG. 3.

Referring to FIG. 2 in conjunction with FIG. 1, the basic support of the device is gear box 115. Rotationally mounted about reference axis A—A to the top plate of the gear box by ball bearings 116 is hub 45. Press fitted to hub 45 is hollow gear 44. Bearing plate 53 is fastened to hub 45 in a plane perpendicular to reference axis A—A so that as bearing servo motor 33 drives hollow gear 44, bearing plate 53 rotates about axis A—A through an angle corresponding to the output signal from the aircraft's bearing indicator.

Belt 52 is preferably provided with transverse ridges or teeth 52' on its inner side and supported on pulleys 51 and 47, which have corresponding indentations or teeth. The reticle 56 representing the aircraft is fastened by pin 55 to the belt and extends upwardly therefrom. By virtue of the gearing 49, 50, pulley 51 is offset from axis A—A so that the span of the belt carrying the reticle traverses the axis and enables the reticle to move to or past the axis. The reticle 56 therefore moves radially and perpendicularly to axis A—A as belt 52 is driven through pinion 50 on shaft 43 extending through hole 48, by range servo motor 24. Pulleys 47 and 51 and gear 49 are mounted on the bottom of bearing plate 53.

Bearing plate or disc 53 has a radial slot 54 cut in it to allow passage of pin 55 when the belt is driven. The top of the slot is tapered 111 to allow passage of reticle 56. Plate 53 is made from some light-conducting material such as methyl methacrylate to serve as a circular lighting disc. Its lower surface is treated in a suitable manner to make the lighting disc opaque to reflect the light upwards and so that the mechanism below is not visible. In the preferred embodiment it is covered with white paint.

Dial plate 58 is fastened to gear box 115 in a plane perpendicular to reference axis A—A and so that central hole 60 in the dial plate is centrally located about axis A—A. Disc 53 fits rotatably in hole 60 which has its periphery marked with the points of a compass rose 61.

Also around the periphery of central hole 60 and cut from the bottom of dial plate 58 and in an upwards direction are a number of longitudinal slots 113. In these slots fastened with a suitable adhesive such as one of the epoxy resins are a number of incandescent lamps 59. The leads 112 of all of the incandescent lamps 59 are brought out and connected in parallel. Adjustable intensity control rheostat 57 is connected in series with the lamps and the secondary of a step down transformer, not shown, the primary of which is across the A.-C. reference voltage line and which steps the reference voltage down to a value suitable for the lamps 59. The circuit connections are not shown.

When assembled the top of reticle 56 which rides over radial slot 54 in taper 111 is flush with the top of disc 53 and just below the top surface of the dial plate 58. A thin transparent plastic sheet 110 shown in FIG. 2 only is stretched over hole 60 and fastened by a suitable adhesive to the dial plate 58 to protect the reticle 56 from being damaged by the maps 63 whose description follows. It should be understood that the map 63 during insertion is kept as close to the reticle 56 as possible to eliminate parallax.

Map guides 62 are fastened to both sides of dial plate 58 and map stop 73 is also fastened to the dial plate between the guides so that when a map 63 is inserted through the guides and against the stop, the key ground transmitter reference station 88 pictured on the map and to which the aircraft's bearing and range receivers are tuned is aligned over reference axis A—A.

Figure 3:
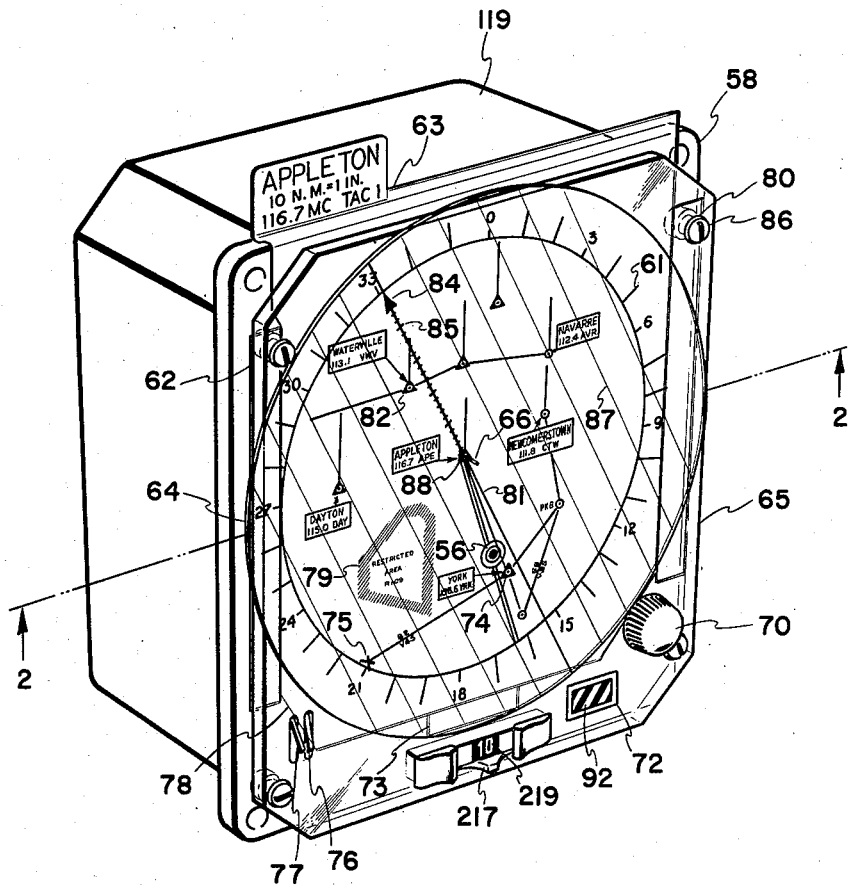
FIG. 3 is a perspective view of the completely assembled Display.

Each map is in the form of a slide made from a transparent plastic film, and pictures all of the pertinent aircraft navigation information for the area adjacent to the key reference station. It locates for instance VHF Omni-Directional Range (VOR) stations and Automatic Direction Finding (ADF) stations and their appropriate frequencies and the radial distances between as well as en-route airways and terminal approaches and other useful navigational information such as are shown for instance in the terminal area charts, low level navigation charts, and intermediate altitude charts presently being manufactured by Jeppesen & Company of Denver, Colorado. Magnetic North is up on all maps. A typical map 63 using the VORTAC station at Appleton, Ohio 88 as the key reference station is shown in FIG. 3.

Maps can be made to any scale but are preferably made in scales of 10, 20, and 48 nautical miles to the inch. A 10 mile per inch map is preferred for terminal areas while a 48 mile per inch map is preferred en route. For areas where more detail is required such as approaches to terminal areas, the 20 mile per inch scale may be used. Maps are constructed with the left hand corner of their leading edge, as inserted, mitred 78. Maps are cut to three different mitre dimensions depending upon the map scale used.

Microswitch actuators 76 and 77 extend above the top surface of dial plate 58 and actuate the poles of switches 18 and 19 respectively. When the actuators are in their normally undepressed condition the poles or switches 18 and 19 are in their normal closed position with respect to their double throw contacts as shown schematically in FIG. 1. Of the three mitre dimensions used, the deepest mitre corresponds to a map scale of 48 nautical miles per inch. When this scale map with its corresponding mitre 78 is inserted into the map guides 62, the map slide does not contact either of the actuators and only resistance 17 is in the range servo circuit. When the 20 nautical mile per inch map is inserted, the mitre dimension is such that microswitch actuator 76 is depressed and the pole or switch 18 is thrown to the normally open contact, so that only resistance 16 is in the range servo circuit. This is the situation illustrated in FIG. 3. When the 10 nautical mile per inch map is inserted, its mitre dimension is such that both microswitch actuators 76 and 77 are depressed and the poles of both switches 18 and 19 are thrown to their normally open contacts, so that only resistance 15 is in the circuit. As discussed heretofore an increase in resistance corresponds to a smaller map coverage scale, so resistor 15 has the highest value of resistance and resistor 17 has the lowest value of resistance for this switching plan. Of course any number of scales, actuators, switches, and resistances could be used.

A cover plate 65 made from some transparent material such as methyl methacrylate is spaced away from the maps 63 by stand-offs 80 and fastened with screws 86 to dial plate 58. Rotationally suspended about axis A—A from the cover plate by pin 66 is circular course disc 64, which is also made from a transparent platsic material such as methyl methacrylate. Marked on the course disc by engraving or painting or some other suitable method are a series of parallel lines 87. The line through the center of rotation of the course disc has an arrowhead 84 whose tip is located at a radius from the center of rotation corresponding to the radius of the azimuth markings on the compass rose 61, so that as the course disc is rotated, the arrowhead sweeps around in alignment with the points of the compass rose. The radius of the line containing the arrowhead is marked in equal increments from the center line with range markings 85. In the present embodiment the markings are $\frac{1}{10}$ of an inch apart.

Referring again to FIG. 2, the pictorial position display is seen to be compactly packaged including the electronic components 120 about gear box 115 by suitable brackets and fastenings. The entire unit is enclosed by cover 119 which fits around dial plate 58 and is secured to the gear box structure by brackets 117 and suitable fastenings 121. Electrical connections from the display to external power sources and the aircraft's navigational computers are made through suitable connectors and cabling, not shown, to the appropriate sources.

The operation of the invention will now be described. The aircraft carrying the pictorial position display will be assumed to be proceeding along Victor Airway 45 from West to East with his destination Waterville, Ohio, and the display operating. As the reticle approaches the circular periphery of the compass rose, the pilot substitutes the map 63 shown in FIG. 3 for the map previously in map guide 62. At the same time he tunes his VOR and DMET receivers to the VORTAC Station at Appleton which occupies the key reference station position at 88 over the reference axis A—A on the substituted map.

The bearing output signal from the bearing indicator with respect to the Appleton VORTAC transmitter is fed into the display bearing servo system through leads 37 and bearing plate 53 is rotated about reference axis A—A so that the bearing represented on the map by the reticle with respect to the map position of Appleton corresponds to the aircraft's actual position with respect to Appleton. Similarly the range output signal from the DMET 11 with respect to the Appleton VORTAC transponder is fed into the display range servo system and drives belt 52 radially from reference axis A—A so that the map range of the reticle with respect to the map position of Appleton corresponds to the aircraft's actual range with respect to Appleton. The reticle will then assume a position approximating that indicated at X75.

The aircraft then proceeds along Victor Airway 45 represented on the map by the line through X75 and the symbol V–45. The pilot can check his position by observing that the reticle moves along the line V–45. When the reticle arrives at the position represented by the VOR fix at York 74, the aircraft has cleared Restricted Area R–109 79 and is free to proceed directly to Waterville 82.

However, there are no map airway lines drawn between York and Waterville to guide him. Therefore he rotates course disc 64 until the course lines are parallel to his departure and destination points, i.e., York and Waterville. This is the course disc position shown in FIG. 3. The arrowhead 84 then indicates that he should keep his compass heading at 332 degrees to keep on course. The pilot is then able to fly to Waterville manipulating his controls so that the reticle moves parallel to the two adjacent course lines 81 and 83 and be assured that he is on course without the necessity for constant checks. The position of the reticle 56 in FIG. 3 indicates this stage of the flight.

Once the aircraft gets north of Appleton 88, the pilot may determine his distance from Waterville 82 by counting the number of range markers 85 between Appleton and the reticle and using an appropriate scale factor.

When the aircraft approaches Waterville, the pilot may wish to have more terminal information available, and so he will substitute a smaller area coverage map keyed to the same reference station, Appleton, and which will cover and trip both actuators 76 and 77 to increase the reticle travel per unit DMET signal input as described heretofore.

In this manner the pilot by switching maps and tuning to the appropriate key reference stations can obtain a continuous visual presentation of a flight across country.

Referring to FIG. 4, there is shown a modification of the previously described distance measuring circuit designed to move reticle 56 in accordance with true range rather than slant range. The relationship between slant range $s$, ground or true range $d$, and altitude $h$ is $$d^2 = s^2 - h^2$$

To obtain $s^2$ a pair of potentiometers 213, 213' are connected so that the voltage of wiper 212 is applied to potentiometer 213' through isolation amplifier 211. Range switches 218 and 231 tap off a plurality of different voltages proportional to the scales of the several maps from A.C. power source 214 resistors 228, 229 and 230 and impress these voltages across potentiometer 213. The movement of wipers 212 and 212' by the DMET apparatus makes the voltage at wiper 212' proportional to $s^2$. The range switch actually comprises a plurality of microswitches operated as previously described in connection with FIG. 1.

The voltage from range switch 218 is impressed on the primary winding of transformer 215, which is connected to altitude switch 216. This switch is operated by a thumbwheel 217, associated with a dial 219 reading in thousands of feet. The altitude switch provides an output voltage which is a square function of linear increments of altitude setting. The altitude switch places a voltage proportional to $h^2$ in series opposition to the voltage representing $s^2$ obtained from wiper 212'. The resultant voltage is supplied to transformer 222 and represents $s^2 - h^2 = d^2$. This voltage is compared with a voltage taken from position potentiometers 220, 220' in the primary winding of transformer 222. The latter feeds servo amplifier 223 and servo motor 224 connected to distance output shaft 226, corresponding to shaft 26 of FIG. 1, and wipers 221 and 221'. Potentiometers 220 and 220' are supplied with voltage from A.C. power source 214 and delivers a voltage proportional to the square of the rotation of shaft 226.

Since the error voltage input to servo amplifier 223 is the difference of two square functions, the input voltage gradient decreases markedly as distance approaches zero. In order to maintain acceptable sensitivity of the servo loop, it is desirable to increase the gain of the amplifier in the region of low voltage gradient. This is accomplished by cam 225 which operates switch 232 connected across a resistor 227 in a feedback circuit of the amplifier. The resistor is short circuited, for example, between zero and 50 degrees of rotation of potentiometers 220 and 220', and beyond 50 degrees cam 225 allows switch 232 to open, placing resistor 227 in the circuit and thereby reducing the gain of amplifier 223 from 50 degrees out to the end of the range of rotation of follow-up potentiometers 220 and 220'.

Figure 5:
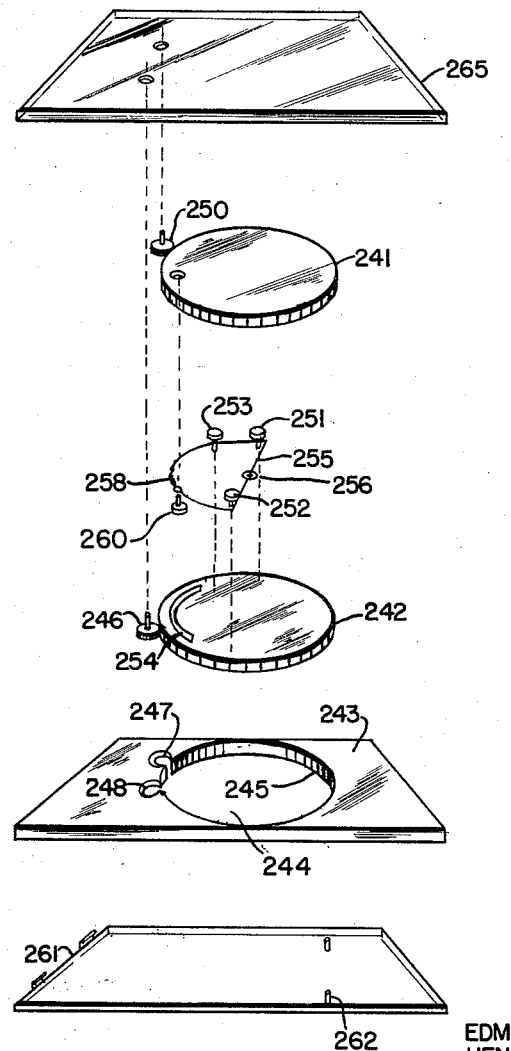
FIG. 5 is a block diagram of another embodiment of a Pictorial Position Display.

In the embodiment of the invention shown in FIG. 5, the range and bearing or azimuth control circuits and drive mechanism are substantially the same as those shown at the bottom of FIG. 1 and in FIG. 4. This apparatus has two outputs; one being the distance drive pinion 250 and the other being the azimuth drive pinion 246, corresponding to gears 50 and 46 of FIG. 1. A pair of Plexiglas or other transparent disc gears 241 and 242 are mounted in support plate 243 having a circular opening 244 with a shoulder 245 for supporting gears 241 and 242 in spaced coaxial relation. The upper one of these gears is somewhat larger than lower one and both have external gear teeth. Distance gear 241 is coupled to drive pinion 250 and azimuth gear 242 is coupled to drive pinion 246. Plate 243 is provided with openings or wells 247 and 248 for receiving pinions 246 and 250.

Gear 242 has pulleys 251 and 252 and guides 253 and 254 mounted thereon for supporting a string or belt 255, to which is fastened an airplane indicator or reticle 256. The pulleys are positioned so that the string 255 carrying the airplane indicator extends diametrically across gear 242. The string preferably includes a tensioning spring 258. One point of the string is fastened to distance gear 241, as by pin 260 mounted in gear 241 and connected to one end of spring 258. A map holder 261 having indexing pins 262 is adapted to receive a map, similar in content to maps 63 referred to above but without the necessity for transparency. It is understood that other features disclosed in FIGS. 1 and 4 and described in connection with these figures are provided in the embodiment of FIG. 5, but for simplicity of illustration are not shown therein.

A transparent cover plate 265 is mounted above gears 241 and 242. Cover plate 265, support plate 243, and map holder 261 are fastened together by suitable means such as screws or bolts, and a housing for the drive mechanism shown at the bottom of FIG. 1 may be suitably fastened to support plate 243. Changes in the range of the aircraft are represented by turning distance gear 241 relative to gear 242, and thereby moving string or belt 255 on its pulleys and guides to cause a translatory movement of indicator 256. Changes in the azimuth angle cause rotation of both gears 241 and 242, azimuth gear 242 being turned by pinion 246 and gear 241 being driven through a differential, indicated at 29 in FIG. 1. Indicator 256 and the map in map holder 261 are visible, of course, through transparent plate 265 and transparent disc gears 241 and 242. In other respects the operation of the embodiment of FIG. 5 is similar to that of FIGS. 1 to 4 and the description thereof applies to the apparatus of FIG. 5.

Several illustrative embodiments have been disclosed herein, but it will be evident to those skilled in the art to which the invention pertains that modifications and variations of the apparatus may be made without departing from the principles of the invention, and therefore the invention is not to be considered as limited except as defined by the following claims.

What is claimed is:

1. An instrument to display the position of a vehicle for use with radio receiving means supplying directional and range information relative to a reference station to which it is tuned comprising: a fixed support having an axis corresponding to the location of a reference station; a movable reticle indicative of said vehicle's position; reticle positioning means on said support and including a first element movable in angular position about said axis; a first servo means to drive said first element about said axis; a belt to which said reticle is attached, means for mounting said belt on said first element for movement along a radial line from said axis, and a second servo means to drive said belt along said radial line; connecting means for applying said directional information to said first servo drive means so that said first element is driven by said first servo drive means to an angular position about said axis which corresponds to said vehicle direction relative to said reference station, connecting means for applying said range information to said second servo drive means so that the reticle moves a distance from said axis corresponding to said vehicle range relative to said reference station; a transparent map including a representation of said reference station and contiguous territory removably mounted to said support over and adjacent said reticle so that said reticle is plainly viewable beneath said map; and map indexing means for aligning said map representation of said reference station on said axis.

2. An instrument for assisting a pilot to navigate an aircraft for use with radio receiving means supplying directional and range information relative to a reference station to which it is tuned comprising: a fixed support having an axis corresponding to the location of a reference station; a movable reticle indicative of said vehicle's position; reticle positioning means on said support and including a first element movable in angular position about said axis, a first servo means to drive said first element about said axis, an endless belt to which said reticle is attached, means including a driving wheel and a pulley for mounting said belt on said first element for movement along a radial line from said axis, and a second servo means for driving said driving wheel; connecting means for applying said directional information to said first servo drive means so that said first element is driven by said first servo drive means to an angular position about said axis which corresponds to said vehicle direction relative to said reference station, connecting means for applying said range information to said second servo drive means so that said second servo means moves the reticle a distance from said axis corresponding to said vehicle range relative to said reference station; a transparent map including a representation of said reference station and contiguous territory removably mounted to said support and adjacent said reticle, said map also including a representation of a flight path to assist a pilot to fly the flight path by maneuvering the aircraft so that said reticle follows said flight path representation; and map indexing means for aligning said map representation of said reference station on said axis.

3. An instrument according to claim 2 further comprising course navigating means including a transparent plate marked with a series of course lines rotatably mounted adjacent to said map.

4. An instrument to display the position of a vehicle for use with radio receiving means supplying directional and range information relative to a reference station to which it is tuned comprising: a fixed support having an axis corresponding to the location of a reference station; a movable reticle indicative of said vehicle's position; reticle positioning means on said support and including a disc movable in angular position about said axis, a first servo means to drive said disc about said axis, an endless belt, means for mounting said belt on said disc for movement of said reticle along a radial line over said axis to a point near the periphery of said disc, said reticle being mounted on said belt, and a second servo means to drive said belt; connecting means for applying said directional information to said first servo drive means for turning said disc about said axis in accordance with said vehicle direction relative to said reference station and for applying said range information to said second servo drive means for positioning said reticle a distance from said axis corresponding to said vehicle range relative to said reference station and means for replaceably mounting a map in said fixed support close to said reticle and said disc and rendering said disc and map viewable one through the other.

5. An instrument to display the position of a vehicle for use with radio receiving means supplying directional and range information relative to a reference station to which it is tuned comprising: a fixed support having an axis corresponding to the location of a reference station; a movable reticle indicative of said vehicle's position; reticle positioning means on said support and including a first gear rotatable about said axis, a first servo means to drive said first gear about said axis, an endless loop to which said reticle is attached, means including a plurality of guides for mounting said loop on said first gear for movement of said reticle diametrically thereacross, a second gear, means connecting an off-center point of the second gear to said loop, a second servo means to turn said second gear and thereby drive said loop, connecting means for applying said directional information to said first servo drive means so that the angular position of said first gear about said axis corresponds to said vehicle direction relative to said reference station and for applying said range information to said second servo drive means so that the reticle moves a distance from said axis corresponding to said vehicle range relative to said reference station; a map including a representation of said reference station and contiguous territory mounted on said support adjacent said reticle.

6. An instrument according to claim 5, wherein said first gear is transparent along the path of travel of said reticle.

7. An instrument according to claim 5, wherein one of said gears is formed of a transparent material.

8. An instrument according to claim 5, wherein said first and second gears are transparent discs having gear teeth on their peripheries, said map being mounted behind said gears for viewing therethrough.

9. An instrument to display the position of an aircraft for use with radio receiving means supplying directional and slant range information relative to a reference station to which it is tuned comprising: a fixed support having an axis corresponding to the location of a reference station; a movable reticle indicative of said aircraft's position; reticle positioning means on said support and including a first element movable in angular position about said axis, a first servo means to drive said first element about said axis, a second element to which said reticle is attached translatably mounted on said first element and variable in distance along a radial line from said axis, a range servo motor drive means to drive said second element along said radial line, a control circuit to generate a control voltage determining the distance said range motor drive means drives said second element, said control circuit including means for converting said slant range information to ground range information; connecting means for applying said directional information to said first servo drive means so that the angular position of said first element corresponds to said aircraft direction relative to said reference station and for applying said range information to said control circuit to produce a control voltage corresponding to said ground range relative to said reference station.

10. An instrument according to claim 9, further comprising means for removably mounting in turn on said support and adjacent said reticle each of a series of transparent scale maps, each map picturing a reference station and adjacent territory; map indexing means for aligning said map representation of said reference station on said axis; said means for converting slant range information to ground range information including means for changing said range servo motor control voltage to correspond to changes in map scale.

11. An instrument according to claim 9 including means for manually adjusting a voltage to a value corresponding to the square of the altitude of the aircraft, and means responsive to altitude voltage and said slant range information for rendering said control voltage proportional to the square of the ground range.

12. An instrument to display the position of an aircraft for use with a power source and radio receiving and computing means supplying directional and slant range information relative to a reference station to which it is tuned comprising: a fixed support having an axis corresponding to the location of a reference station; a movable reticle indicative of said aircraft position; reticle positioning means on said support and including a disc rotatable about said axis, a first servo motor drive means to turn said disc about said axis, a first control circuit to supply first control current to said first servo motor drive means, an endless belt to which said reticle is attached, said belt being translatably mounted on said disc for movement of said reticle along a radial line from said axis, a range servo motor drive means to drive said belt and a second control circuit to supply a second control current to said range servo motor drive means; first connecting means for applying said directional information to said first control circuit so that the angular position of said disc corresponds to said aircraft direction relative to said reference station, means for converting said slant range information to ground range information and for applying said ground range information to said second control circuit so that the reticle moves a distance from said axis corresponding to the ground range relative to said reference station.

13. Pictorial position display apparatus mounted in an aircraft for indicating the range and bearing of the aircraft relative to a ground reference station, comprising first and second coaxial transparent discs mounted one above the other, a string loop mounted on the first of said discs and having a portion extending radially thereof, an aircraft indicator fixed to said radial portion of the loop, means connecting another portion of said loop to an eccentric point of said second disc, means for rotating said second disc in correspondence to said distance relative to the reference station, means for rotating both discs together in correspondence with said bearing to position said indicator according to the position of the aircraft relative to the reference station, and means for supporting a map below said discs for viewing through said discs.

References Cited by the Examiner

UNITED STATES PATENTS

| 2,497,913 | 2/50 | Rines | 235—191 |
| 2,679,033 | 5/54 | Hartman | 343—112 |
| 2,914,853 | 12/59 | Michell | 235—61 |
| 2,929,553 | 3/60 | Child | 235—61 |

FOREIGN PATENTS 1,129,502  9/56  France.

MALCOLM A. MORRISON, Primary Examiner.

L. SMILOW, Examiner.